UNITED STATES PATENT OFFICE.

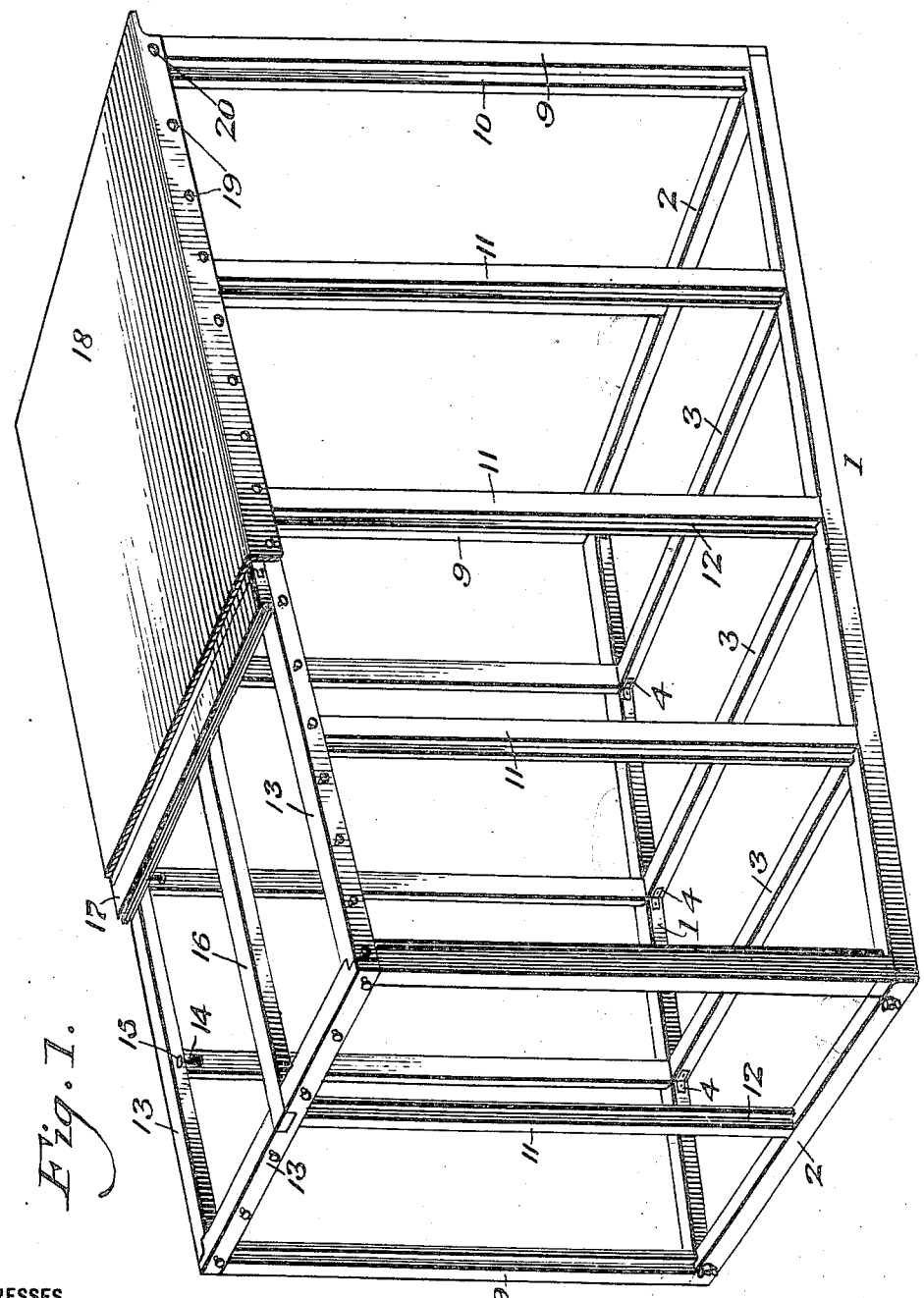

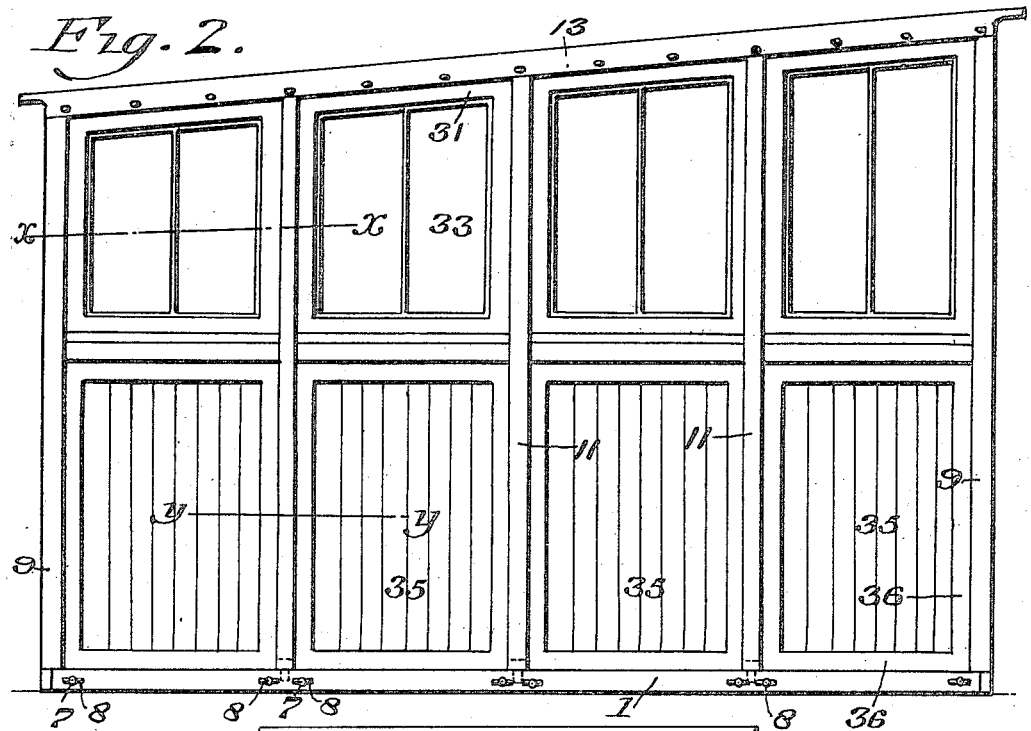
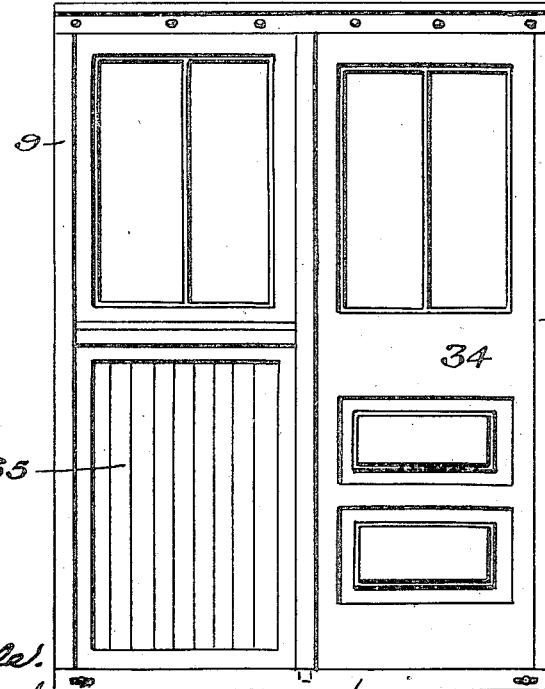

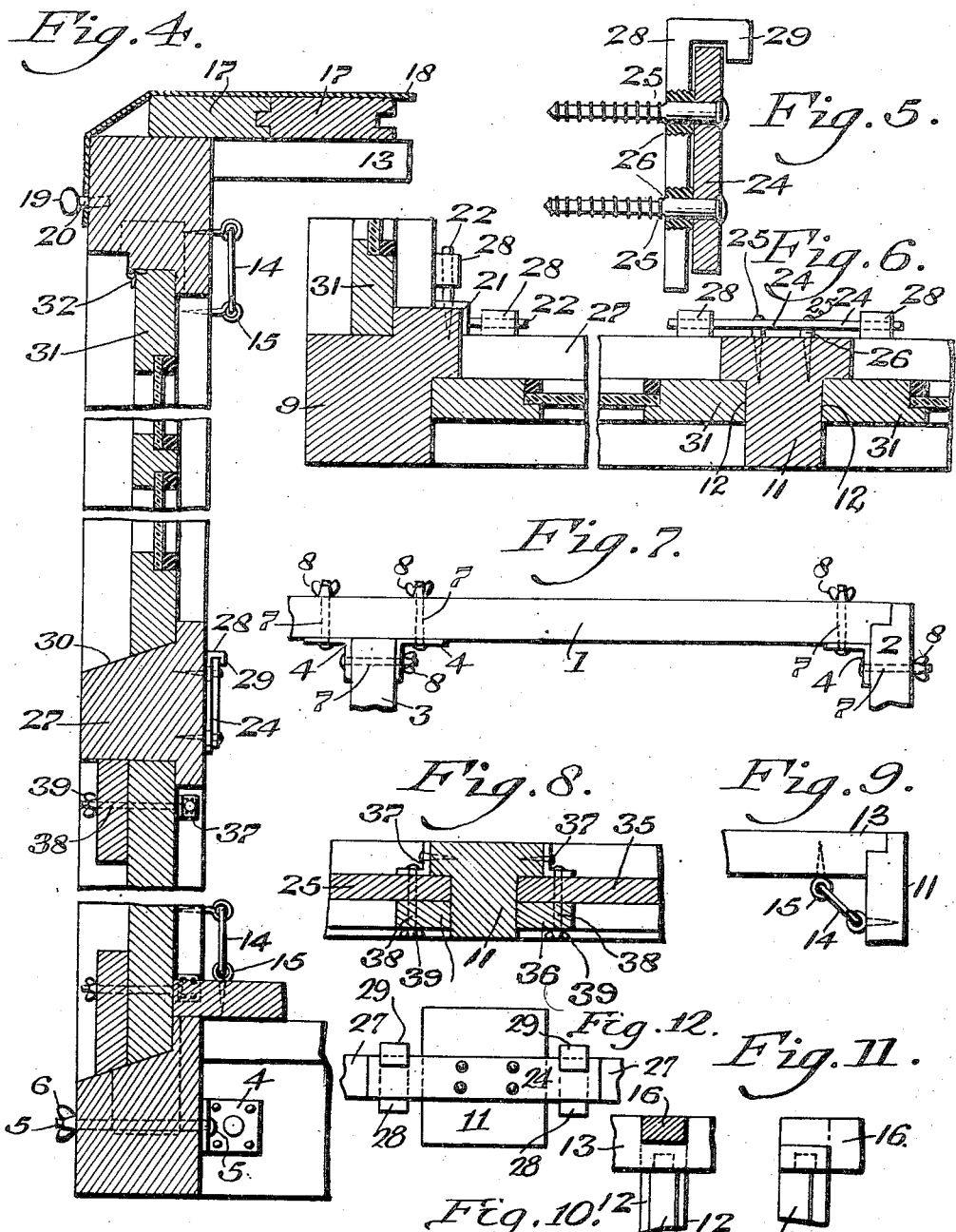

JAY B. ROSENHEIM, OF PHILADELPHIA, PENNSYLVANIA.

KNOCKDOWN SHACK.

1,124,063.  Specification of Letters Patent.  Patented Jan. 5, 1915.

Application filed May 27, 1913. Serial No. 770,144.

*To all whom it may concern:*

Be it known that I, JAY BOULAND ROSENHEIM, a citizen of the United States, residing in the city and county of Philadelphia, State of Pennsylvania, have invented a new and useful Knockdown Shack, of which the following is a specification.

This invention relates to portable houses and more particularly to knock-down shacks for consumptives' use in camps or locations where the air is most advantageous to the cure of those afflicted with tubercular trouble.

It has for an object to provide a house comprising a plurality of unit sections of knock-down construction, whereby the size of the house may be regulated as desired by the number of unit sections employed.

It has for a further object to provide a house of portable or knock-down type with means for allowing free circulation of air therethrough from all sides and giving a maximum area for the admission of air to the interior thereof, which area may be regulated and adjusted according to the desire or condition of the occupant.

It further consists of other novel features of construction, all as will be hereinafter fully set forth.

For the purpose of illustrating my invention, I have shown in the accompanying drawings one form thereof which is preferred by me, although it is to be understood that the various instrumentalities of which my invention consists can be variously arranged and organized and that my invention is not limited to the precise arrangement and organization of these instrumentalities as herein shown and described.

Figure 1 represents a perspective of the frame of a portable house or shack embodying my invention. Fig. 2 represents a side elevation showing the panel construction for the units forming the sides. Fig. 3 repsents a front elevation of the door unit for the house and an end panel. Fig. 4 represents a vertical transverse section of the house. Fig. 5 represents a detail of construction. Fig. 6 represents a section on line *x—x* of Fig. 2. Fig. 7 represents a plan of a portion of the construction showing the manner of securing the cross pieces to the outside sill. Fig. 8 represents a section on line *y—y* of Fig. 2. Fig. 9 represents a detail showing the securing means for removably securing certain of the parts together. Figs. 10 and 11 are respectively end and side views. Fig. 12 represents a detail front view of one of the supports for the intermediate stringers or sills.

Similar numerals of reference indicate corresponding parts in the figures.

Referring to the drawings, 1 designates the bottom side sill of a knock-down or portable framework of which 2 designates the end sills and 3 the cross pieces or braces between the aforesaid side sills 1. In the present instance, the side sills 1 are provided with a plurality of angle members 4, arranged one at each end of each sill and the remaining angles being spaced apart in pairs at suitable intervals to receive the cross pieces or braces 3. The end angles 4 are apertured to receive a bolt 5, which is adapted to pass through the end sill 2 and receive on the end thereof a thumb-nut 6, whereby the parts are fixedly and removably secured together. The side angles 4 are removably carried on the sills 1 by means of bolts 7 and thumb-nuts 8 and each pair thereof receives a cross piece 3 therebetween and holds the same by a similar bolt 7 and thumb-nut 8, it being evident that by this construction any of the cross pieces may be removed from the side sill or the side sills correspondingly detached from the end sills 2, so that the entire base portion of my novel structure may be readily taken apart or put together. It will further be noted that the end and side sills are suitably mortised together, as shown in Fig. 4, and the same construction is used to reinforce the joint between the sills 1 and the cross pieces or braces 3.

9 designates the corner posts or uprights for the frame which are suitably mortised to the bottom sills and each of which is rabbeted on two adjacent sides to form recesses 10 adapted to receive the side walls which will presently be described.

11 designates suitable posts forming intermediate uprights between the end posts and which, in the present instance are rabbeted on two opposite sides as shown at 12, whereby each of said posts 11 is substantially T-shaped in cross section forming a longitudinal recess on each side to receive the panel or wall construction heretofore referred to. The uprights 11 are suitably mortised into the respective sills 1 and 2 and have a like connection with the top or roof sills 13, as will be readily understood. Attention is here directed to the fact that in the preferred embodiment of my invention the top sills 13 are removably secured to the uprights 11 by hooks 14 and screw eyes 15 or similar devices for performing the same function.

16 designates a centrally disposed brace mortised at its ends to the end roof sills 13 and serving as an intermediate support for the tongue and groove roof boards 17, which latter in the present instance, are of the same length as the width of the completed structure and rest upon the sills 13 and 16, as shown in Fig. 1. In order to maintain the said roof boards 17 in position and protect the same as well as the interior of the structure from rain and dampness, a cover or roof of suitable material, such as waterproofed canvas or the like 18, is placed upon the boards 17 and is of sufficient size to overlap at all sides so that it may be secured by buttons 19 passing through suitable openings 20 in said canvas 18. It will further be noted that it is preferable to give the roof a suitable pitch so that it will properly drain and prevent the collection of water on the top thereof.

21 designates an angle fixed to each of the corner posts 9, at a point substantially central of the longitudinal length thereof, by means of screws 22 which project laterally a suitable distance from the face of the angle 21, in order to form a bracket or support for certain adjuncts carried by the intermediate sill.

24 designates a plate fixed to the middle upright 11 at substantially the middle thereof by means of screws 25 or like fastening devices, it being noted that washers 26 are interposed between the said plate and the upright 11 in order to space the said plate a suitable distance from the upright for a purpose later to be disclosed.

27 designates the intermediate sills which are adapted for insertion between the posts 9 and 11 and in the present instance each sill or stringer is provided with a hanger 28 at each end having the hook end 29 adapted to seat on the plate 24 as well as upon the projecting end of one of the screws 22. The intermediate sills 27 are thus removably secured between adjacent posts and are supported by the hangers 28, which seat upon their respective supports 22 and 24, and it will of course be understood that there are as many intermediate sills provided as there are spaces between the uprights. It will further be noted that the intermediate sills 23 are each provided with a water table 30 to properly drain the window openings thus formed.

31 designates a window sash adapted to fit in the opening formed by the top and intermediate sills and the uprights and which sash, in the present instance, is hinged to the structure as shown at 32. By reference to Fig. 2, it will be seen that the entire upper portion of the frame is provided with windows 33, with the exception of the front of the structure in which a door 34 is hung in any desired manner.

The lower portion of the house is preferably formed of panel structure of knockdown form comprising a plurality of tongue and groove boards 35 which are removably held in place by means of a frame 36 the latter being secured to the upright structure by means of angles 37 and the bolts 38 provided with wing nuts 39, as will be apparent by reference to Fig. 4, so that the entire panel structure may be taken apart or assembled in a comparatively short space of time.

Attention is directed to the fact that the entire device is made up of unit sections so that it is a simple matter to vary the size of the house or shack by omitting a unit or units or by adding on the desired number of units to give an enlarged size.

In assembling the structure the bottom sills are suitably placed and bolted together, including of course the cross braces 3 at the bottom. The uprights 9 and 11 are next placed in position and have the top sills 13 fitted thereto by the mortising and are fastened by the hook and eye construction. The intermediate sills 27 may now be hung by seating the hook hangers 28 on the plates 24 and projections 22 after which the window sashes are hinged in place and the panels properly fixed in their respective openings.

It will now be apparent that I have devised a complete unitary structure particularly adapted for the purpose intended, simple in construction and inexpensive to construct and which further may be assembled or taken apart in a minimum of time.

It will now be apparent that I have devised a novel and useful construction of a knock-down shack which embodies the features of advantage enumerated as desirable in the statement of the invention and the above description, and while I have, in the present instance shown and described a preferred embodiment thereof, it is to be understood that the same is susceptible of modification in various particulars without departing from the spirit or scope of the invention or sacrificing any of its advantages.

Having thus described my invention, what I claim as new and desire to secure by Letters Patent, is:—

1. In a knock-down house, a vertical post, horizontal stringers having their ends adapted to bear against opposite sides of such post, a plate secured upon and spaced from the face of the post and having its ends projecting beyond the sides of the same, and brackets secured to the ends of the stringers and formed with open hooks adapted to engage the projecting ends of the plate.

2. In a knock-down house, vertical posts having rabbets in their facing sides, a vertical panel having side-edges in said rabbets, angle-irons secured to the facing sides of said posts, a frame having its sides bearing against the faces of said panel at the edges of the panel, bolts passing through the wings of said angle-irons and through the panel and frame, and thumb-nuts upon said bolts.

JAY B. ROSENHEIM.

Witnesses:
C. D. McVAY,
M. E. BYRNE.